(12) United States Patent
Gonzalez Leon et al.

(10) Patent No.: US 11,898,039 B2
(45) Date of Patent: Feb. 13, 2024

(54) ADDITIVE FOR ASPHALT MIXES CONTAINING RECLAIMED BITUMINOUS PRODUCTS

(71) Applicant: ARKEMA FRANCE, Colombes (FR)

(72) Inventors: Juan Antonio Gonzalez Leon, Lyons (FR); Gilles Barreto, Messimy (FR); Vincent Luca, Solaize (FR)

(73) Assignee: ARKEMA FRANCE, Colombes (FR)

( * ) Notice: Subject to any disclaimer, the term of this patent is extended or adjusted under 35 U.S.C. 154(b) by 1383 days.

(21) Appl. No.: 16/164,020

(22) Filed: Oct. 18, 2018

(65) Prior Publication Data

US 2019/0048191 A1 Feb. 14, 2019

Related U.S. Application Data

(63) Continuation of application No. 14/348,916, filed as application No. PCT/EP2012/070248 on Oct. 12, 2012, now Pat. No. 10,119,026.

(Continued)

(30) Foreign Application Priority Data

Oct. 12, 2011 (FR) ...................... 11.59198

(51) Int. Cl.
   C08L 95/00 (2006.01)
   C04B 26/26 (2006.01)
   (Continued)

(52) U.S. Cl.
   CPC ............ *C08L 95/00* (2013.01); *C04B 26/006* (2013.01); *C04B 26/26* (2013.01);
   (Continued)

(58) Field of Classification Search
   CPC ....................................................... C08L 95/00
   See application file for complete search history.

(56) References Cited

U.S. PATENT DOCUMENTS

5,234,494 A   8/1993  Sawatzky et al.
5,513,443 A   5/1996  Hatfield
              (Continued)

FOREIGN PATENT DOCUMENTS

FR   2853647 B1   6/2006
FR   2915204 B1   6/2011
              (Continued)

OTHER PUBLICATIONS

Arega, Zelalem; Bhasin, Amit; Motamed, Arash; Turner, Fred. Influence of Warm-Mix Additives and Reduced Aging on the Rheology of Asphalt Binders with Different Natural Wax Contents. Journal of Materials in Civil Engineering vol. 23, No. 10. published online Apr. 2, 2011. (Year: 2011).*

(Continued)

*Primary Examiner* — Alexandra M Moore
(74) *Attorney, Agent, or Firm* — Smith, Gambrell & Russell, LLP

(57) ABSTRACT

Presented is a method of improving the incorporation of recycled bituminous products by using at least one surfactant as an alternative to the known rejuvenating oils, for the preparation of asphalt mixes containing recycled bituminous products. The use of such alternative surfactant(s) results in better mechanical properties of the asphalt mix, while using smaller amounts of fresh bitumen and greater amounts of recycled bituminous products.

23 Claims, 1 Drawing Sheet

Related U.S. Application Data

(60) Provisional application No. 61/546,124, filed on Oct. 12, 2011.

(51) Int. Cl.
 *C04B 26/00* (2006.01)
 *C04B 40/00* (2006.01)
 *C08K 5/3445* (2006.01)
 *C08K 5/36* (2006.01)
 *C08K 5/52* (2006.01)
 *C04B 111/00* (2006.01)

(52) U.S. Cl.
 CPC ........ *C04B 40/0039* (2013.01); *C08K 5/3445* (2013.01); *C08K 5/36* (2013.01); *C08K 5/52* (2013.01); *C04B 2111/0075* (2013.01); *C08L 2555/34* (2013.01); *Y02W 30/91* (2015.05)

(56) References Cited

U.S. PATENT DOCUMENTS

| | | |
|---|---|---|
| 6,186,700 B1 | 2/2001 | Osman |
| 6,214,103 B1 | 4/2001 | Kitagawa |
| 6,588,974 B2 | 7/2003 | Hildebrand et al. |
| 7,510,606 B2 | 3/2009 | Bourrel et al. |
| 7,758,686 B2 | 7/2010 | Ballie et al. |
| 7,811,372 B2 | 10/2010 | Nigen-Chaidron et al. |
| 8,252,872 B2 | 8/2012 | Tournilhac et al. |
| 8,382,890 B2 | 2/2013 | Barreto et al. |
| 8,652,246 B2 | 2/2014 | Antoine et al. |
| 2006/0215483 A1 | 9/2006 | Helf |
| 2008/0276834 A1 | 11/2008 | Jorda |
| 2009/0215931 A1 | 8/2009 | Reinke et al. |
| 2010/0034586 A1* | 2/2010 | Bailey ............... E01C 23/065 106/504 |
| 2010/0055304 A1* | 3/2010 | Reinke ............... E01C 23/065 428/403 |
| 2010/0192805 A1 | 8/2010 | Barreto et al. |
| 2011/0005429 A1* | 1/2011 | Gonzalez Leon . C08G 65/3353 524/69 |

FOREIGN PATENT DOCUMENTS

| | | |
|---|---|---|
| GB | 2462371 B | 5/2013 |
| JP | H11-36215 A | 2/1999 |
| WO | 2006/011448 A1 | 2/2006 |
| WO | 2006/016041 A1 | 2/2006 |
| WO | 2008/148974 A2 | 12/2008 |
| WO | 2009/033060 A1 | 3/2009 |
| WO | 2010/017283 A2 | 2/2010 |

OTHER PUBLICATIONS

International Search Report for PCT/EP2012/070248 dated Feb. 4, 2013.
International Preliminary Report on Patentability for International Application No. PCT/EP2012/070248 dated Apr. 15, 2014.
Written Opinion of the International Searching Authority for International Application No. PCT/EP2012/070248 dated Apr. 12, 2014.
Junan Shen; Serji Amirkhanian and Jennifer Aune Miller: Effects of Rejuvenating Agents on Superpave Mixtures Containing Reclaimed Asphalt Pavement; May 2007, pp. 376-384.
"Rejuvenators" Pavement Interactive http://www.pavementinteractive.org/rejuvenators/. Accessed Nov. 30, 2017 (Year: 2017) 1 Page.

* cited by examiner

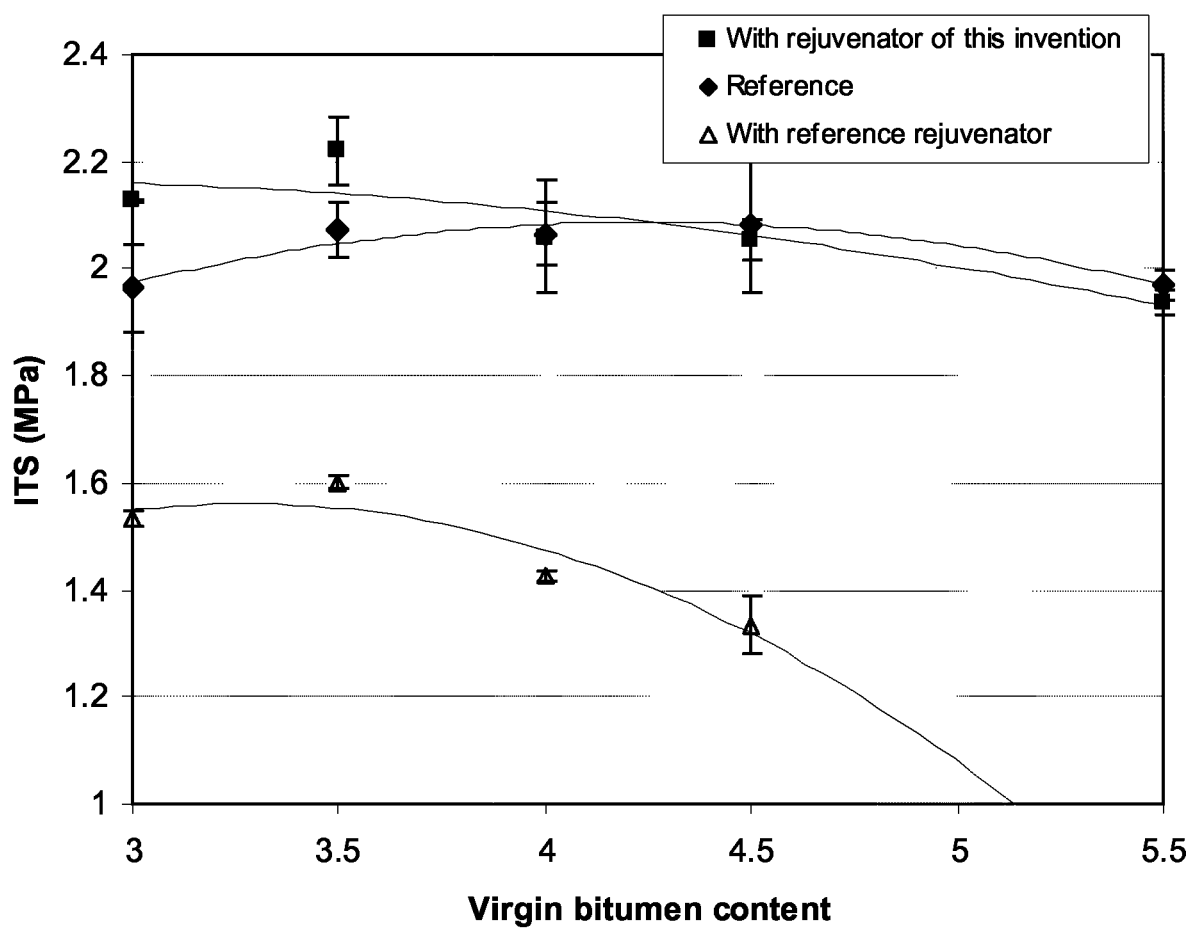

ADDITIVE FOR ASPHALT MIXES CONTAINING RECLAIMED BITUMINOUS PRODUCTS

FIELD OF THE INVENTION

The present invention relates to bitumen and asphalt mix additives, their uses and applications in the preparation of asphalt mixes containing recycled bituminous materials.

Examples of applications for the present invention are the production of asphalt mixes with mineral aggregates, these asphalt mixes being used in pavement and waterproofing, and more specifically for construction, repair and maintenance of sidewalks, roads, highways, parking lots or airport runaways and service roads and any other rolling surfaces.

BACKGROUND ART

Bitumen (or asphalt) is the heaviest portion from the oil distillation process. Due to the different origins and distillations processes of such oils, the resulting bitumen may have a wide range of properties and characteristics. In the present invention, bitumen refers not only to the product from oil by direct distillation or from distillation of oil at reduced pressures, but as well to the products coming from the extraction of tar and bituminous sands, the products of oxidation and/or fluxation with carbonated solvents including paraffins and waxes, as well as solvents derived from vegetable oils, of such bituminous materials, and also blown or semi-blown bitumens, synthetic bitumens using renewable materials (such as those described for example in FR-A-2 853 647 and in FR-A-2 915 204), tars, oil resins or indene-coumarone resins mixed with aromatic and/or paraffinic hydrocarbons and the mixtures of such, the mixtures of such bituminous materials with acids and the like.

The main application for bitumen is in asphalt mixes where the bitumen is mixed with mineral aggregates that can be of different sizes, shapes and chemical natures, said bitumen performing the function of binder for the said aggregates. These asphalt mixes are particularly used for construction, repair and maintenance of sidewalks, roads, highways, parking lots or airport runaways and service roads and of any other rolling surfaces.

Mineral aggregates used in asphalt mixes generally are products from quarries, and are more and more often used in admixture with aggregates recuperated from previously fabricated asphalt mixes. Such recuperated aggregates are known under the generic name of RAP, i.e. Reclaimed Asphalt Pavement (see for example AFNOR XP P98-135, December 2001, or Asphalt Handbook, MS-4, 7$^{th}$ edition, published by the Asphalt Institute, USA).

RAPs also include recycled asphalt mixes wherein the mineral aggregates are replaced in whole or in part with other common components, such as, by way of limiting examples, organic and inorganic fibers (e.g. glass, metal or carbon fibers, cellulose, cotton, and the like), polymers (e.g. polypropylenes, polyesters, poly(vinyl alcohol)s, polyamides, polyurethanes, poly-ureas, EVA and SBS polymers, and the like).

Of particular interest are the recuperated or recycled aggregates, commonly known as RAP. These aggregates are the result of milling (or other grinding method) of previously constructed pavements, which are generally damaged and need to be replaced. These recycled aggregates contain bitumen (the one used as binder during their previous fabrication).

Other sources of bituminous products that may also be recycled into pavement fabrication are for example roofing products (such as shingles or waterproofing membranes, as well as waste materials coming from their production), isolation or sound damping materials, and the like.

In the description of the present invention, "recycled bituminous product" is understood as any kind of manufactured product comprising bitumen as one of its components, where the said manufactured product comprising bitumen has been previously used or discarded after production. Non limiting examples of such recycled bituminous products are the reclaimed asphalt pavement (also known as RAP) obtained from the milling of roads and other rolling surfaces, waterproof membranes, bituminous shingles used in roofing (reclaimed asphalt shingle, RAS), sound-proof panels, wastes coming from their production the mixtures of two or more thereof, and the like.

There are nowadays indeed economically and environmentally interests in incorporating recycled bituminous products (aggregates and/or other bitumen-bound components as described above) into new asphalt mixes. Significant savings may be obtained by re-using the bitumen already present in such recycled bituminous products, since the binder is usually the most expensive component in asphalt mixes. Moreover, bitumen is non renewable. Additionally, the extraction and production of bitumen from its original sources (crude oil) have an important impact of the environment, and such impact is lowered when using RAP.

Nonetheless, constraints on quarries make it difficult to extend existing quarries or create new quarries for larger exploitation. As a result, aggregates are also considered as non renewable materials.

The addition of recycled bituminous products, including the binder contained in them, is however not an easy process. The bitumen contained in such recycled bituminous products is usually aged, and thus harder than fresh regular pavement bitumen. This is one of the reasons why a limited amount of bituminous recycled products, such as RAP, is generally added into asphalt mixes.

There are several methods to add RAP or other recycled bituminous products into an asphalt mix. For example, before its incorporation into the mix, RAP may be preheated (generally above 100° C.), without exceeding a certain limit in order to avoid smokes and further oxidation of the bitumen. An advantageous aspect of this method is that the binder for RAP is softened, and thus its incorporation and mixing together with the fresh bituminous binder is facilitated. This process however requires the investment to dedicated equipment to preheat the RAP.

Another approach consists in introducing the recycled product at ambient temperature directly into the hot mixer (generally at a temperature of above 100° C.), said mixer containing virgin aggregates. The heating of the recycled product takes place and then the mixing with hot fresh (or virgin) bitumen is realized. Although this approach presents the advantages of requiring little equipment investment, it is more difficult for the aged binder contained in the RAP to be mixed with the virgin bitumen due to the limited contact time before cooling. Additionally, smoking can be significant when contacting RAP and the heated virgin aggregates.

All these methods using RAP lead to the conclusion that although the amount of fresh aggregates may be lowered, fresh bitumen still needs to be added in large amounts since the aged bitumen present in the RAP is not at all or not completely reusable.

Facing this problem, the skilled artisan already tried to find solutions aiming at softening the bitumen present in the recycled bituminous products, so that the RAP aged bitumen is reusable to a larger extent, the amount of fresh bitumen is lowered, and the mixing with the rest of the other components is easier.

A solution that is presently commonly used consists in compensating the hardness of the aged bitumen contained in reclaimed bituminous products by adding oils (aliphatic, aromatic or combination of both) and/or other solvent-like products. These oils and other solvent-like products soften the aged bitumen present in the reclaimed bituminous products, making it easier to release it and mix it with the other components of the asphalt mix. These oils and/or solvent-like products are sometimes referred to as "rejuvenators" or "rejuvenating oils" or "rejuvenation oils".

When used in the description of the present invention, the expressions "rejuvenator", "rejuvenating additive", "rejuvenating agent" mean any additive that eases (or facilitates) the mixing and incorporation of a recycled bituminous product into fresh bitumen or into an asphalt mix, during an asphalt mix production process.

For example, U.S. Pat. No. 6,214,103 discloses the use of a non-volatile oil, chosen from petroleum hydrocarbons, natural oils or synthetic hydrocarbons, in amount between 0.15% and 0.5% by weight with respect to the total amount of asphalt mix. This allows the incorporation of between 30% and 80% of RAP in the preparation of asphalt mixes.

U.S. Pat. No. 6,186,700 discloses the use of a rejuvenating oil, emulsifier, recycled asphalt, pavement asphalt concrete oil, anti-strip additives and liquid silicone for the preparation of a pavement and patch material for paving surfaces. The emulsifier additive disclosed in this patent assists in mixing the composition when there is water or a moisture content either in the recycled asphalt roofing waste or aggregate.

In U.S. Pat. No. 7,811,372, the use of palm oil is described as a rejuvenating agent composition containing also bitumen. In the examples, amounts of palm oil in the order of 5% in weight with respect to the total bitumen content were used to obtained physical properties of the bitumen close to fresh bitumen.

GB 2 462 371 describes the use of plant-derived oils in amounts between 2% and 20% of the total mass of bitumen as a rejuvenator of asphalt.

In US 2006/0215483, the use of a terpenoid liquid, such as modified soybean oil, canola oil or corn oil, is used in combination with bitumen for preparing asphalt mixes containing RAP. The content of such terpenoid liquid claimed to be necessary is between 4 wt % and 40 wt % with respect to the amount of fresh added bitumen.

In all the above examples, a relative large quantity of such rejuvenators is necessary to improve the incorporation of RAP into an asphalt mix. One drawback is the necessity of large rejuvenator storage facilities. Moreover, although these rejuvenators may facilitate the incorporation of RAP or other recycled bituminous products, such rejuvenators are generally not efficient enough: in a number of cases, only a partial dissolution of the aged and hard reclaimed binder occurs, leading to only a partial mixing with the rest of the asphalt mix. This results in an asphalt mix with poor mechanical properties due to the heterogeneity of the asphalt mix components.

Also, the relatively high amount of rejuvenator oils may lead to asphalt mixes with relatively poor mechanical properties. Still another problem that may be encountered is the evolution over time of the mixtures containing such additives. Shortly after preparation, the rejuvenator may have not completely dissolved the hard (aged) bitumen, the prepared asphalt mix may be too soft (mainly because of the soft added virgin bitumen), so that early rutting often occurs. The larger the quantity of RAP introduced, the larger the amount of rejuvenating oil to be used to soften the aged bitumen, and the higher the risk of rutting.

Later after preparation, say after the rejuvenator may have completely dissolved the hard bitumen or may have been evaporated, a very hard asphalt mix is observed, so hard that it may become brittle and not appropriate for a number of applications, such as rolling pavements.

Therefore, it is of practical interest to find out alternative to the commonly used rejuvenators in order to still improve the incorporation of aged hard bitumen present in recycled bituminous products.

WO 2010/017283 discloses a cold-in-place recycling method comprising mixing an ethoxylated diamine surfactant, water and an asphalt binder, the resulting foamed composition being mixed with 100% milled recycled pavement aggregates. This application teaches that the binder is coated or more uniformly spread over the particles. This is a clear teaching that the reclaimed binder plays no role in the invention of this application, i.e. the reclaimed binder is not rejuvenated.

Warm asphalt mixes containing up to 30 wt % of RAP are presented in WO 2009/033060 where they are prepared from functionally dry asphalt binder and a lubricating additive. Functionally dry asphalt binder refers to asphalt binder composition that contains less water or moisture than is routinely used in conventional or known warm mixes. The technique disclosed in this international application is therefore not applicable to asphalt binders that are conventionally and routinely used for paving rolling surfaces. Again, this application does not teach any rejuvenating effect of the reclaimed binder.

A first objective of the present invention is the provision of alternative additives allowing improving the mixing of recycled bituminous products in the preparation of asphalt mixes. Another objective consists in providing additives that allows for the use of recycled bituminous products in larger amount during the preparation of asphalt mixes.

Still another objective is the provision of new additives leading to the lowering of the amount of fresh bitumen in the preparation of asphalt mixes with recycled bituminous products. According to a further objective, the present invention proposes to use alternative additives that further enhance the mechanical strength of asphalt mixes prepared with recycled bituminous products.

All the afore-mentioned objectives, as well as even others that will appear in the below description of the present invention, are met in all or in part when using alternative additives to the well known rejuvenators in the preparation of asphalt mixes with recycled bituminous products.

BRIEF DESCRIPTION OF THE INVENTION

The present invention describes a method to improve the incorporation of recycled bituminous products by using additives other than the known rejuvenating oils. The use of such alternative additives facilitate the mixing of the aged binder present in recycled bituminous products with fresh bitumen used in the preparation of asphalt mixes, resulting in better mechanical properties of the mix, while using smaller amounts of fresh bitumen, and greater amounts of recycled bituminous products such as RAP or RAS.

In the present invention, a method to prepare asphalt mixes containing recycled bituminous products, such as RAP, and/or reclaimed waterproofing shingles (also called reclaimed asphalt shingles or RAS), and/or membranes and/or waste coming from their production, is described. The method of the invention comprises the use of surfactant (surface-active agent) that improves the final properties of an asphalt mix containing recycled products. Examples of applications of the use of surfactant according to the present invention are the production of asphalt mixes, preferably warm or hot asphalt mixes, more preferably hot asphalt mixes, with mineral aggregates used in waterproofing, construction or maintenance of sidewalks, roads, highways, parking lots or airport runaways and service roads, as well as any other rolling surfaces.

DETAILED DESCRIPTION OF THE INVENTION

According to a first aspect, the present invention relates to an improved process for preparing an asphalt mix comprising a fraction of at least one recycled bituminous product, the improvement consisting in adding at least one surfactant during said preparation of the said asphalt mix, as a rejuvenator of the said at least one recycled bituminous product.

More precisely, the invention relates to an improved process for preparing an asphalt mix with a fraction of at least one recycled bituminous product, the improved process comprising the following steps of:
  a) optionally providing fresh bitumen,
  b) providing a fraction of at least one recycled bituminous product,
  c) optionally providing fresh aggregates,
  d) providing at least one surfactant as a rejuvenator for the at least one recycled bituminous product,
  e) optionally providing a rejuvenating oil,
  f) mixing together items a) to e) in any order, and
  g) obtaining said asphalt mix.

The expression "fresh bitumen" means bitumen which has not already been contacted with aggregates for the preparation of asphalt mixes. The expression "fresh aggregates" means aggregates which have not already been contacted with bitumen for the preparation of asphalt mixes.

The methods described in the present invention comprise the use of any of the asphalt mix production techniques known in the art, for example those where the different components are directly mixed at the same or different temperatures, those where a bitumen emulsion or a bitumen foam is used, as a total or partial replacement of the fresh bitumen, those where a rejuvenating oil emulsion or a rejuvenating oil foam is used, as a total or partial replacement of the rejuvenating oil, and the like.

In one embodiment, the process of the present invention comprises the step of mixing at least one recycled bituminous product with optionally, but preferably, mineral aggregates, optionally virgin (i.e. fresh) bitumen and at least one surfactant. In another embodiment, the process of the present invention comprises the step of mixing at least one recycled bituminous product, optionally, but preferably, mineral aggregates, at least one surfactant additive, water, optionally with a breaking control additive, optionally, but preferably together with an emulsion of virgin bitumen.

Breaking control additives are well known in the art, and generally refer to water solubilized-emulsifiers, and/or mineral salts that are able to delay the "breaking" of the emulsions of bitumen in contact with water and/or air and/or aggregates.

When fresh mineral aggregates are added in the process of the present invention, their amount preferably ranges from about 5 wt % to about 95 wt %, preferably from about 5 wt % to about 75%, more preferably from about 5 wt % to about 50 wt %, relatively to the total mass of the final asphalt mix.

The present invention also encompasses an asphalt mix preparation method wherein the at least one surfactant is directly added to the at least one recycled bituminous product before the addition of additional fresh mineral aggregates and virgin bitumen. According to still another embodiment, the process of the present invention comprises the step of mixing at least one recycled bituminous product, mineral aggregates, optionally water, with foamed virgin bitumen comprising at least one surfactant additive.

According to this embodiment, one alternative consists in foaming the virgin bitumen containing the at least one surfactant with the injection of water and/or air, according to techniques well known by the skilled in the art. Another alternative consists in first preparing the foamed virgin bitumen and then adding the at least one surfactant to the said foamed virgin bitumen.

In each of the above embodiments, the at least one surfactant may be added in the pure state, or dissolved, dispersed or in the form of an emulsion, in another liquid. Suitable liquids for dissolving, dispersing or bringing into emulsion the at least one surfactant, include water, organic solvents, such as for example alcohols, and the like. Especially suitable is water, particularly for the preparation of asphalt mixes with bitumen emulsions or foamed bitumen.

According to a preferred aspect of the present invention, the amount of surfactant used as a rejuvenator in the preparation of recycled bituminous product(s) containing-asphalt mixes generally ranges from 0.05 wt % to 10 wt % with respect to the total mass of bitumen present in the final asphalt mix, more preferably from 0.1 wt % to 5 wt %, and even more preferably from 0.1 wt % to 2.5 wt %.

According to a preferred embodiment, the fraction of recycled bituminous product(s) ranges from about 5 wt % to about 99.5 wt % of the total mass of the final asphalt mix, more preferably from about 10 wt % to about 99 wt %, even more preferably from about 35 wt % to about 99 wt %, most preferably from about 40 wt % to about 99 wt %. Other preferred asphalt mixes of the present invention are those wherein the fraction of recycled bituminous product(s) ranges from about 10 wt % to about 80 wt %, even more preferably from about 12 wt % to about 50 wt %, of the total mass of the final asphalt mix.

It has surprisingly been discovered that the use of at least one surfactant for the preparation of an asphalt mix comprising at least one recycled bituminous product:
  allows for the use of a smaller amount of fresh (virgin) bitumen; and
  leads to improved mechanical properties of the final asphalt mix.

The surfactant, for use in the preparation of asphalt mixes comprising at least one recycled bituminous product, may be any surfactant known as such by the skilled artisan. Some surfactant-comprising bitumen are already known from the prior art, wherein the surfactants are used as adhesion agents, i.e. they are added into the bitumen for enhancing the adhesion properties between aggregates and bitumen.

However, in recycled bituminous product-containing asphalt mixes, the aged bitumen of the recycled bituminous product already firmly adheres to the aggregates of said recycled bituminous product, so that the adhesion property issue is limited in comparison to asphalt mixes which do not contain any recycled bituminous product. In other words, the larger the content of recycled bituminous product in an asphalt mix, the smaller the adhesion property issue. Hence the scope of the present invention does not encompass the issue of the enhancement of the adhesion properties between aggregates and bitumen using surfactants.

Generally speaking, surfactants are compounds comprising at least one hydrophilic moiety as well as at least one lipophilic moiety. Surfactants generally belong to four different classes, depending on their electronic charge, non-ionic, anionic, cationic, and zwitterionic (or amphoteric).

According to a particularly preferred aspect, surfactants for use in the present invention belong to the non-ionic or cationic classes, preferably to the non-ionic class.

According to another preferred aspect, the at least one surfactant used in the present invention comprises two or more identical or different heteroatoms, said heteroatoms being chosen from among nitrogen, oxygen, phosphor and sulfur. Still more preferably, the at least one surfactant comprises more than two identical or different heteroatoms. Even more preferably, at least two heteroatoms are different from one another.

According to one preferred aspect, the at least one surfactant for use in the present invention is defined by general formula (A1):

$$[A\text{-}O\text{---}B\text{---}]_d Z \quad (A1)$$

wherein:

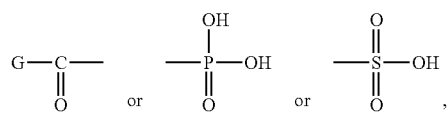

A is chosen from hydrogen and a group G or

G represents a linear or branched, saturated or unsaturated, $C_1$-$C_{30}$ hydrocarbon chain, optionally containing at least one aromatic cycle, and optionally substituted by at least one phosphate group, preferably one phosphate group, B represents a bond or a divalent group containing at least one alkylene oxide repeating unit, d represents 1 or 2, and Z represents a radical of formula Z1 or Z2, preferably Z represents Z1:

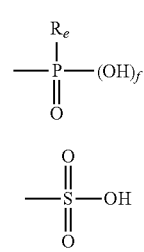

wherein R is hydrogen or a linear or branched $C_1$-$C_6$ alkyl, f is 0 or 1 or 2, e is 0 or 1, and d+e+f is 3, provided that when d is 2, then Z is Z1, e is 0 and P is linked to two identical or different, preferably identical, groups [A-O—B—] as defined above, and provided that in the case where d is 1, Z may also represent hydrogen or a group G or

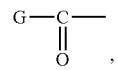

wherein G is as defined above.

In the context of the present invention, alkylene oxide preferably means butylene oxide (BO), propylene oxide (PO) or ethylene oxide (EO), it being understood that a "divalent group containing at least one alkylene oxide repeating unit" is a divalent group that may comprise BO and/or PO and/or EO repeating unit(s).

More preferably, B represents a divalent group containing propylene oxide (PO) and/or ethylene oxide (EO) repeating units, generally statistically arranged or in blocks, preferably in blocks. Even more preferably B is a statistical or block copolymer of ethylene oxide and propylene oxide with 4 to 500 repeating units, with a mass ratio (ethylene oxide/copolymer) of between 1% and 70%.

According to another embodiment of the present invention, the said PO and/or EO repeating units are bonded to Z by a single bond or by a linear or branched hydrocarbon chain with, preferably, one, two or three carbon atoms. Preferably, the PO and/or EO repeating units are directly bonded to Z (single bond), the oxygen atoms of PO or OE repeating units being bonded to Z.

Preferably, Z is Z1, B comprises, and preferably represents, $-(CH_2CH(CH_3)O)_g-(CH_2CH_2O)_h-$, block or statistically arranged, wherein g is between 0 and 10, and h is between 0 and 80, preferably between 8 and 80, and more preferably between 20 and 60. In this case, surfactant of formula A1 may be represented by formula $A1_O$:

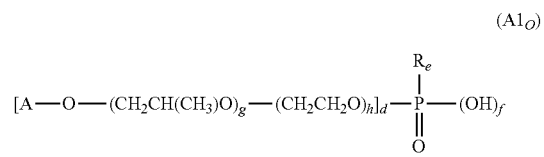

wherein A, R, d, e, f, g and h are as described above.

Alternatively, when the PO and/or EO repeating units (block or statistically arranged) are bonded to Z by a hydrocarbon chain, and Z is Z1, surfactant of formula A1 may be described by the following formula $A1_C$:

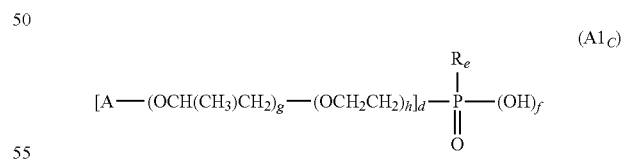

wherein A, R, d, e, f, g and h are as described above.

According to a preferred embodiment, in the additive of general formula A1, g represents 0, when A contains at least 10 carbon atoms. Still according to a preferred embodiment, in the additive of general formula A1, g is comprised between 8 and 80, preferably between 20 and 60, when A contains less than 10 carbon atoms.

According to another aspect of the present invention, Z is Z1, B may represent a single bond, and in this case A1 may be represented by formula $A1_B$:

(A1$_B$)

wherein A, R, d, e and f are as described above.

According to still another embodiment of the present invention, A and Z each represent hydrogen and B is a statistical or block copolymer of ethylene oxide and propylene oxide with 4 to 500 repeating units, with a mass ratio (ethylene oxide/copolymer) between 1% and 70%. Preferably, B is a triblock copolymer with the propylene oxide forming the middle block. In this case A1 may be represented by formula A1$_H$:

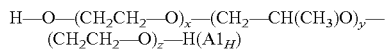

wherein x, y and z are the number of repeating units of each kind, the sum x+y+z ranging from 4 to 500 and the ratio 44(x+z)/(44(x+z)+57y) ranging from 0.1 to 0.7.

According to a further aspect of the present invention, A represents hydrogen, d is 1, Z represents a group G or

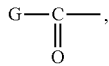

wherein G represents a linear or branched, saturated or unsaturated, $C_1$-$C_{30}$ hydrocarbon chain, optionally containing at least one aromatic cycle, and B represents a divalent group containing at least one propylene oxide repeating unit (PO) and/or at least one ethylene oxide repeating unit (EO).

According to still another aspect of the present invention, the at least one surfactant is of formula A1 as defined above, wherein d is equal to 1, Z represents B1, B is as defined above, and A represents

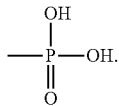

According to another aspect of the present invention, the at least one surfactant is of formula A1, wherein d is 2, in which case said formula A1 may be represented by formula A1$_2$:

wherein both groups (A-O—B—) are identical or different, preferably identical, A and B being as defined above.

In another preferred embodiment, the at least one surfactant of formula A1 has not more than 3 phosphorous atoms.

All surfactants A1 as hereinbefore defined, including surfactants or formulae A1$_O$, A1$_C$, A1$_B$, A1$_H$ and A1$_2$, are known compounds and are readily available from known suppliers, or alternatively may be easily prepared from known procedures available in patents, in non-patent literature, in scientific publications, in the Chemical Abstracts, and/or on the Internet.

Examples of surfactants of formula A1 for use in the context of the present invention are readily available from Lakeland Chemical under the trade name Lakeland LDP62®.

According to still another aspect of the present invention, the at least one surfactant is defined by the general formula (E1):

(E)$_j$-Y   (E1)

wherein:
E is chosen from among G,

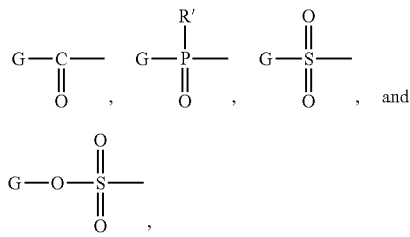

G represents a linear or branched, saturated or unsaturated, $C_1$-$C_{30}$ hydrocarbon chain, optionally containing at least one aromatic cycle, and optionally substituted by at least one phosphate group, preferably one phosphate group, j represents 1 or 2, and R' is chosen form among HO—, Q-O— and Q, wherein Q is a linear or branched $C_1$-$C_6$ alkyl radical, Y represents a group chosen from among —O-T, —S-T, —N(H)$_{(2-j)}$-T, and —NT$_1$T$_2$, preferably Y represents —N(H)$_{(2-j)}$-T or —NT$_1$T$_2$, provided that Y is not —S-T, when E is bound to Y via a sulfur atom, T represents hydrogen or a linear, branched or cyclic or cyclic-containing moiety having carbon and hydrogen atoms, and optionally one or more heteroatoms chosen from among nitrogen, oxygen, sulfur and phosphorus, T$_1$ and T$_2$, identical or different have the same meaning as for T above, or T$_1$ and T$_2$, together with the nitrogen atom to which they are bonded, represent a saturated, partially saturated or unsaturated heterocycle, optionally further comprising one or more heteroatoms chosen from among nitrogen, oxygen, sulfur and phosphorus.

According to a preferred embodiment, T, or T$_1$ and T$_2$, represents a polyalkyl-amine-containing group or an imidazolidone-, imidazolidinone- or imidazoline-containing group. Even more preferably the polyalkyamine-containing group is a group derived from dimethylaminopropylamine, N-amino-ethylpiperazine, diethylenetriamine, triethylenetetramine, tetraethylenepentamine, pentaethylenehexamine (PEHA), and the like.

According to another preferred embodiment, T, or T$_1$ and T$_2$, represents an imidazolidone-containing group derived from 1-(2-aminoethyl)imidazolidin-2-one (UDETA), 1-(2-[(2-aminoethyl)amino]ethyl)imidazolidone (UTETA), 1-(2-{2-[(2-aminoethylamino]-ethyl}amino)ethyl]imidazolidone (UTEPA), 11-mercapto-N-(2-(2-oxoimidazolidin-1-yl)-ethyl)undecanamide, 1-(2-hydroxylethyl)-imidazolidin-2-one (HEIO), N-(6-aminohexyl)-N'-(6-methyl-4-oxo-1,4-dihydropyrimidin-2-yl)urea (UPy), 3-amino-1,2,4-triazole (3-ATA), 4-amino-1,2,4-triazole (4-ATA), and the like. Most preferably, T is derived from UDETA and is one preferred derivative representing T.

According to still another preferred embodiment of the present invention, the at least one surfactant is represented by formula E1, wherein E is G, and G represents a $C_{14}$-$C_{22}$ linear or branched, preferably linear, saturated or partially unsaturated hydrocarbon chain, preferably partially unsaturated hydrocarbon chain, j is equal to 1 and Y is polyethyleneamine. In this case, E1 may be represented by formula $E1_A$:

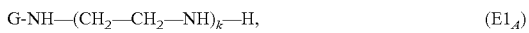

G-NH—(CH$_2$—CH$_2$—NH)$_k$—H,      (E1$_A$)

wherein k ranges from 1 to 5.

Examples of surfactants of formula $E1_A$ for use in the present invention are readily available from CECA under the generic trade name Polyram®.

In another preferred embodiment, the at least one surfactant is represented by formula E1, wherein E represents

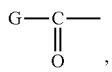

G is $C_{14}$-$C_{22}$, linear or branched, preferably linear, saturated or partially unsaturated hydrocarbon chain, preferably partially unsaturated hydrocarbon chain, j is equal to 1 and Y is polyethylene amine. In this case, E1 may be represented by formula $E1_B$:

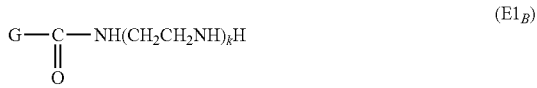

(E1$_B$)

wherein G and k are as defined above.

Examples of surfactants of formula $E1_B$ for use in the context of the present invention are readily available from CECA under the generic trade name Cecabase®.

In still another preferred embodiment, the at least one surfactant is represented by formula E1, wherein E represents

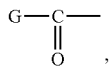

where G is a $C_{14}$-$C_{22}$, linear, saturated or partially unsaturated hydrocarbon chain, preferably partially unsaturated hydrocarbon chain, j is 1 and Y is a radial derived from 1-(2-aminoethyl)imidazolidin-2-one (UDETA), 1-(2-hydroxyethyl)imidazolidin-2-one (HEIO) or 1-(2-mercaptoethyl)imidazolidin-2-one. In these cases, surfactants of formula E1 may be respectively represented by formula E1c, $E1_D$ and $E1_E$:

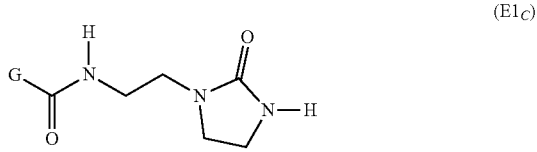

(E1$_C$)

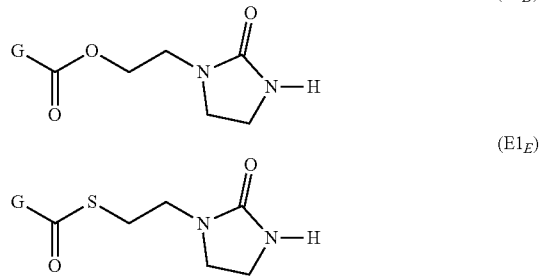

Some of hereinbefore-defined surfactants of formula E1, including those of formulae $E1_A$, $E1_B$, $E1_C$, $E1_D$, $E1_E$ are known compounds, for example as disclosed in WO 2006/016041, or are readily available from known suppliers, or alternatively are easily prepared from known procedures, which are available in patents or non-patent literature, in scientific publications, in the Chemical Abstracts, and on the Internet.

According to another embodiment of the present invention, the above-defined surfactants of formula E1 may be modified, according to general methods known in the art, such as, by way of non limiting examples, by reaction with alkylene oxides, for example EO and/or PO and/or BO; or by ionization with an inorganic or organic acid, such as hydrochloric acid, phosphoric acid, acetic acid, and the like.

Examples of surfactants modified by reaction with alkylene oxides for use in the context of the present invention are readily available from CECA under the generic trade names Noramox® and Dinoramox®.

The improved process of the present invention may also comprise a further step consisting in adding one or more other additives, such as for examples one or more of those commonly used in the field of bitumen and asphalts, such additives possibly being chosen from among:

polyphosphoric acid, comprising all different existing grades and designations of polyphosphoric acids including pyrophosphoric acid, triphosphoric and metaphosphoric acids with phosphonic acid, pyrophosphates, and other similar compounds comprising at least one (OH—)P═O group, such as those described in WO 2008/148974, polymers, generally used in order to improve the mechanical performance of the bitumen and the asphalt mix, waxes, such as Fischer-Tropsch waxes, e.g. described in U.S. Pat. No. 6,588,974, fluxants, organic or inorganic acids, esters of fatty acids and functionalized waxes, resin components, such as rosin acids, or modified rosin acids, tall oil pitch, pine tar pitch, pine rosins, tall oil rosins, asphaltites, e.g. Gilsonite®, oils from vegetal or mineral sources and derivatives thereof, organic fibers (for example: cellulose, cotton, polypropylene, polyester, polyvinyl alcohol and polyamide fibers) and/or inorganic fibers (for example: glass, metal or carbon fibers), as well as mixtures of two or more of the above additional additives.

Such further additives are preferably added into the virgin bitumen. These further additives may also be added at any stage of the claimed process, and preferably together with the at least one surfactant as hereinbefore-described.

Non-limiting examples of polymers generally used in order to improve the mechanical performance of the bitumen and the mixture, i.e. commonly used in the modification of bitumen are: styrene/butadiene rubbers, styrene/butadiene block copolymers, ethylene/vinyl acetate copolymers, polyethylene and other alpha-polyolefins, such as for example those disclosed in "Asphalt binder testing manual", Asphalt Institute 2007.

The improved method of the present invention, which comprises the step of adding at least one surfactant as described above, in the preparation of asphalt mixes containing recycled bituminous products, has many advantages. Among these advantages, it has been surprisingly discovered that the added at least one surfactant can be used as an alternative to the commonly used rejuvenation oil(s) for improving the mixing of recycled bituminous products into asphalt mixes.

As an other advantage, it has been discovered that smaller amounts of surfactant(s), than those used with the standard rejuvenating oils, are more than enough to fulfill the requirements of the known rejuvenation oil(s).

Another advantage of the use of surfactant(s) in the improved process of the present invention is that it makes it possible to obtain asphalt mixes containing larger amounts of recycled bituminous product(s), while obtaining at least the same, or even better, mechanical properties for similar asphalt mix(es) prepared with conventional rejuvenation oil(s). The increase in amounts of recycled bituminous product(s) generally varies from 2 wt % to 50 wt %, preferably from 5 wt % to 20 wt %, with respect to the amounts used in similar processes using conventional rejuvenation oil(s).

As a further advantage of the improved process of the present invention, it has also been surprisingly discovered that the use of at least one surfactant allows to lower the required amount of fresh bitumen to be added, and even to avoid the addition of fresh (virgin) bitumen, during the preparation of asphalt mix(es) comprising recycled bitumen product(s), while maintaining, or even enhancing, the mechanical properties of the said asphalt mix(es).

As a general rule, the optimal bitumen content of an asphalt mix may be obtained following the so called "Marshall Mix Design Method" as described for example in Asphalt Handbook, MS-4, $7^{th}$ edition, published by the Asphalt Institute, USA. One of the criteria in this method for assessing the optimal bitumen content consists in observing the very asphalt binder content leading to the maximum stability of the asphalt mix, most generally the maximal strength registered during an indirect tensile strength test.

According to this Marshall Mix Design Method, the improved process of the present invention makes it possible to decrease the fresh bitumen content, at which this maximum stability of the asphalt mix is observed, by up to 100 wt %, frequently by 4 wt % to 80 wt %, generally by 8 wt % to 40 wt %, more generally by 10 wt % to 30 wt %, with respect to the fresh bitumen content required for reaching the maximum stability of similar asphalt mixes prepared with conventional rejuvenating oils.

The easier mixing of the recycled bituminous product(s) as a consequence of the improved process of the present invention thus results in improved mechanical properties of the obtained asphalt mixes. The above-mentioned advantages may be observed through various standard or modified asphalt mix tests such as indirect tensile strength tests (as described for example in NF EN 12697-23), mechanical modulus tests (as described for example in NF EN 12697-26) rutting tests (as described for example in NF EN 12697-22+A1), fatigue tests (as described for example in NF EN 12697-24), flow number tests, moisture resistance tests (as described for example in NF EN 12697-12) and low temperature performance tests (as described for example in NF EN 12697-46).

This remarkable effects are totally unexpected with regard to the teaching of the prior art and the knowledge of the skilled in the art, used to adding rejuvenating oils during according to the well known processes of preparation of asphalt mixes containing recycled bituminous products.

The present invention therefore provides for a very efficient alternative to the use of rejuvenating oils and all in all serves at promoting the fabrication of asphalt mixes from recycled bituminous products, thereby leading to a better recycling of such recycled bituminous products such as, for example, RAP and/or RAS.

Although the improved process for the preparation of asphalt mixes containing recycled bitumen product(s) according to the present invention makes use of at least one surfactant instead of conventional rejuvenating oils, such oils may also be used together with the said at least one surfactant.

The improved process of the present invention also includes the use of rejuvenating oils, as commonly known in the art, together with at least one surfactant as hereinbefore described. Rejuvenating oil(s) and surfactant(s) may be added, during the preparation process, as a mixture, at the same time, sequentially, separately, or in any manner according to the knowledge of the skilled in the art. Thus use of both at least one surfactant and at least one rejuvenating oil in the herein-before improved process is also part of the resent invention.

According to a preferred embodiment, at least one surfactant and at least one rejuvenating oil are added together, optionally in the form of a pre-mix, during the preparation of an asphalt mix containing at least one recycled bituminous product.

As such, still another object of the present invention is a pre-mix containing at least one surfactant and at least one rejuvenating oil, said rejuvenating oil being chosen from the rejuvenating oils known in the art, and preferably chosen from among mineral, animal and vegetal oils, as well as their derivatives that are commonly used to soften the aged bitumen present in recycled bituminous products.

Examples of such rejuvenating oils are the aromatic or aliphatic oils, fatty acids, fatty acid esters, synthetic and natural phenolic compounds. Particularly preferred are the oils obtained from olives, grape-fruit, peanuts, walnuts, nuts, cashew-nuts and the like.

The above-described pre-mix generally comprises at least one surfactant and at least one rejuvenating oil, the weight ratio surfactant/rejuvenating oil ranging between 1/99 and 50/50, preferably between 10/90 and 40/60. Such pre-mix may also comprise one or more of the above listed other additives commonly used in the field of bitumen and asphalts.

The present invention also encompasses asphalt mixes substantially obtained according to the improved process of the present invention, said asphalt mix comprising at least one recycled bituminous product and at least one surfactant as a rejuvenator, with or without, preferably without, any other rejuvenating oil.

The asphalt mixes prepared according to the improved process of the present invention may be used as any other asphalt mixes known in the art. By way of non-limiting examples, the asphalt mixes obtained according to this improved process find applications in the construction of rolling surfaces, such as roads, parking lots, bridges, motorways, highways, airport runaways or any similar rolling surface, and also in the construction of any surface requiring bituminous or asphalt coating, such as pavements, side walks, playgrounds and the like.

Such rolling surfaces prepared from at least one asphalt mix comprising at least one recycled bituminous product and at least one surfactant as a rejuvenator, with or without, preferably without, any other rejuvenating oil, are also part of the present invention.

According to a further object, the present invention deals with the use of at least one surfactant as rejuvenating agent in the preparation of an asphalt mix comprising a fraction of at least one recycled bituminous product. Preferably, the at least one surfactant used as a rejuvenating agent is chosen from among non-ionic and cationic surfactants, preferably among non-ionic surfactants, and comprises 2 or more identical or different heteroatoms, said heteroatoms being chosen from among nitrogen, oxygen, phosphor and sulfur, preferably comprises more than two identical or different heteroatoms, more preferably, at least two heteroatoms which are different from one another, and still more preferably, the at least one surfactant used as a rejuvenating agent is of formula A1 or of formula E1, as herein-before described.

The present invention is further illustrated with the following examples which do not intend to limit the scope of the present invention, the scope of which is as defined in the annexed claims.

EXAMPLES

Example 1: Preparation and Testing of an Asphalt Mix with RAP and Anhydrous Bitumen An asphalt mix comprising 98 wt % of reclaimed asphalt pavement of granular size 0/10 mm and 2 wt % of bitumen is prepared according to the process of the invention. The RAP used in this example is heated in an oven at 120° C. for 2 hours before mixing it mechanically with 2 wt % of bitumen B1. No additional mineral aggregates, other than those from the RAP, were added to the asphalt mix.

Bitumen B1 is previously prepared before it is poured into the RAP by adding a 0.8% by weight of a surfactant additive, according to the invention, into a bitumen, at 160° C., with penetration grade of 50/70 1/10 mm (Azalt, TOTAL) and mixing with a mechanical agitator for 15 min. The surfactant additive used is commercially available from CECA under the trade name CECABASE RT945.

The quantity of surfactant in bitumen B1 corresponds to 0.4 wt % of the total amount of bitumen present in the asphalt mix additive (about 0.025% by weight of the total mass of asphalt mix). is The resulting asphalt mix is compacted just after mixing, using a gyratory press under 6 bar, to achieve a void percentage of 7%. The compacted sample is then cooled down and kept at constant temperature (20° C.) for 24 hours before testing.

Reference samples are prepared in a similar manner, using bitumens of various penetration grades (70/100, 50/70 and 35/50 1/10 mm) that did not contained any additive. Another sample was carried out for comparison with a 50/70 1/10 mm bitumen containing 2% by weight of the total mass of bitumen of a Fischer-Tropsch wax, with a melting point of about 110° C., known to reduce the viscosity of bitumen at production temperatures. The used wax does not include any hydrophilic groups, thus cannot be considered as a surfactant according to the invention.

Indirect tensile tests measurements are carried out on all samples using an Instron universal testing machine on compression at a 50 mm/min rate. Three samples for each additive or bitumen tested are tested. Values for the maximal strength obtained from the compression curves are shown in the following Table 1.

TABLE 1

| Sample | ITS (MPa) | Standard deviation (MPa) |
| --- | --- | --- |
| Reference with 70/100 1/10 mm bitumen | 2.16 | 0.22 |
| Reference with 50/70 1/10 mm bitumen | 2.59 | 0.13 |
| Reference with 35/50 1/10 mm bitumen | 2.73 | 0.11 |
| Sample with 50/70 1/10 mm bitumen and non-surfactant additive | 2.57 | 0.09 |
| Sample with 50/70 1/10 mm bitumen and a surfactant additive according to the invention | 2.89 | 0.08 |
| Sample with 70/100 1/10 mm bitumen and a surfactant additive according to the invention | 2.31 | 0.06 |

As can be seen from the above results, the bitumen penetration value does have an important impact on the cohesion of the sample. The reference with the softer binder, 70/100 1/10 mm penetration, has the lower ITS while the harder, with 35/50 1/10 mm penetration has the highest. The fresh binder added does seem to control the final mechanical properties of the sample. The sample containing the non-surfactant additive did not modify the ITS of the asphalt mix. The samples according with the invention, containing the surfactant additive, did improved the ITS of the mix, particularly the one made with a 50/70 1/10 mm bitumen. The value obtained in this case is actually higher than that made with a harder bitumen, 35/50 1/10 mm, indicating that a better mix between the softer 50/70 1/10 mm bitumen and the aged and harder bitumen present on the RAP took place.

Example 2: Preparation and Testing of an Asphalt Mix with RAP and Bituminous Emulsion A bituminous emulsion is prepared using a 70/100 1/10 mm penetration bitumen from TOTAL, containing 2 wt % of a rapeseed oil methyl ester and 0.5 wt % of a surfactant additive according to the invention, which is available from Lakeland Chemical under the trade name Lakeland LDP62®. The emulsion comprised 60 wt % of the before mentioned bitumen and 40% of an aqueous solution containing 5% of an emulsifier (available from CECA under the name Polyram® L920) acidified to pH 2 with hydrochloric acid, according to conventional techniques in the preparation of bitumen emulsions. The aqueous phase is added at a temperature of between 40° C. et 50° C., and the bitumen is added at a temperature of about 150° C. into a colloidal mill to obtain the emulsion.

Another emulsion is prepared in a similar manner as a reference, where the bitumen used in the emulsion does not contain any surfactant additive. Measurements on the average diameter of the bitumen particle in the emulsions (using a Coulter LS230 laser granulometer), show no impact of the addition of surfactant additive of this invention on the size dispersion of bitumen on emulsion.

Asphalts mixtures are prepared with the emulsions prepared as described above. Two kg of RAP, containing 5 wt % of bitumen, were extracted from a wearing course of a highway and crushed into a size with a maximum passing sieve size of 10 mm. In order to prepare the asphalt mixes, the RAP was mixed at ambient temperature with 200 g of fresh aggregates, 3 wt % of water containing 1 wt % of Stabiram® MS6 from CECA S.A. as an emulsion breaking-controlling agent, according to known techniques, and then with 4.5 wt % of an emulsion.

The same procedure is carried out for the preparation of asphalt mixes with the emulsion prepared with the additive according to this invention and the emulsion prepared with the reference bitumen. The mixtures turn black after 30 seconds of mixing. The mixtures are stored for 2 hours at ambient temperature in 100 mm inner diameter molds and then subjected to compaction with a gyratory shear compactor, where 120 gyrations are applied under a pressure of 6 bars, with an angle of 1°, at a speed of 30 RPM.

The samples are then removed from the molds and stored for 14 days at 21° C. They are then compressed axially at a temperature of 21° C. (compression speed of 20/mm/min) and the maximum force registered during compression is recorded. Two sample of each emulsion are prepared and tested.

The cohesion is represented by the average maximum force of 2 tests. For the reference sample, the measured cohesion value is 31.3 kN, whereas the cohesion value is of 36.6 kN for the sample prepared with the emulsion containing the surfactant additive described in this invention.

Example 3

Asphalt mixes containing 40 wt % of reclaimed asphalt pavement are prepared with varying amounts of added virgin bitumen in order to assess the effect of the amount of virgin bitumen on the final mechanical properties of the asphalt mixes.

The procedure followed is similar to that used for the determination of optimal bitumen content according to a Marshall Mix Design (Asphalt Handbook, MS-4, 7$^{th}$ edition, published by the Asphalt Institute, USA). The samples, however, are compacted using a gyratory press compactor to a fixed height in order to obtain a constant void content in all samples. The mixtures are prepared by mixing 40 wt % by weight of a reclaimed asphalt pavement (with a bitumen content of 4 wt %) with 56 wt % to 58 wt % (depending on the amount of added fresh bitumen, see below) of previously heated virgin mineral aggregates with a size ranging form 0 to 10 mm. The reclaimed asphalt pavement is added at room temperature.

To this aggregate mix, virgin bitumen (with a penetration grade of 50/70 1/10 mm) is added in various amounts, ranging from 3 wt % to 5.5 wt % with respect to the total weight of all the aggregates (virgin (fresh) aggregates and aggregates from reclaimed asphalt). In order to illustrate the invention, a virgin bitumen is also prepared with a surfactant as described in the previous description.

This surfactant is of formula (A-O—(CH$_2$CH(CH$_3$)O)$_g$—(CH$_2$CH$_2$O)$_h$)$_d$—P(=O)—OH$_f$, wherein d is between 1 and 2, d+f is 3, g is 0, h is 4 and A is a linear hydrocarbon chain comprising from 16 to 18 carbon atoms. The surfactant additive used is available from Lakeland Chemical under the trade name Lakeland LDP62®. Only 0.4 g of this surfactant are added to 100 g of virgin bitumen. The mix is stirred at 160° C. for 10 minutes before it is added to the aggregate mix.

The asphalt mix is then prepared in a laboratory mixer and compacted using a gyratory compactor at 6 bars to obtain cylindrical samples of constant height. After one day storage at room temperature, the samples are tested using a universal testing machine in compression. The indirect tensile strength, ITS, is measured for each sample.

Two other sample sets (using the same materials and preparation conditions) are also prepared as references. In one of them, the virgin bitumen does not contain any surfactant. In the other one, a classical rejuvenating oil, a methyl ester of a fatty acid coming from a rape seed oil, is used. The rejuvenating oil amount is 3 g in 100 g of virgin bitumen. The rejuvenating oil and the virgin bitumen were mixed together, prior to the addition to the aggregate mix, in the same way as for the bitumen with the surfactant as described hereinbefore.

FIG. 1 shows the measured ITS values (in MPa) for the various sample sets, as a function of the amount of virgin bitumen (wt %).

As can be observed on FIG. 1, the maximal, or optimal, amount of virgin bitumen for the reference sample set (without surfactant or rejuvenating oil) is between 4 and 4.5 wt %. With the reference rejuvenating oil, it is observed that the optimal bitumen content is somewhere around 3.5 wt %, showing that the use of rejuvenating oil for the preparation of RAP containing-asphalt mixes allows for the addition of a reduced amount of virgin bitumen.

However, it is also very clear that the presence of rejuvenating oil in the asphalt mixes lead to a dramatic drop in mechanical resistance, as evidence by the observed low ITS values.

On the contrary, the use according to the present invention of at least one surfactant for the preparation of RAP containing-asphalt mixes surprisingly not only allows for an even lower amount of virgin bitumen to be added, as compared to RAP containing-asphalt mixes with rejuvenating oil, but also yields asphalt mixes with improved mechanical properties, as evidenced by the observed ITS values that are even greater than those obtained with the reference RAP containing-asphalt mix (without rejuvenating oil and without surfactant).

The invention claimed is:

1. A process for the preparation of an asphalt mix, comprising mixing together, in any order:
   (a) fresh aggregate,
   (b) fresh bitumen,
   (c) at least one recycled bituminous product containing aged bitumen and reclaimed aggregate, and
   (d) at least one surfactant, which surfactant functions as a rejuvenator of the said aged bitumen and the at least one surfactant is of formula A1:

$$[A-O-B-]_dZ \qquad (A1)$$

wherein:
   A is chosen from hydrogen and a group G or

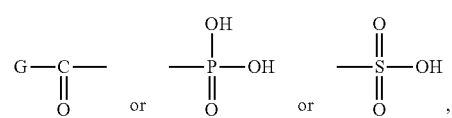

G represents a linear or branched, saturated or unsaturated, C$_1$-C$_{30}$ hydrocarbon chain, optionally containing at least one aromatic cycle, and optionally substituted by at least one phosphate group,
   B represents a bond or a divalent group containing at least one alkylene oxide repeating unit,
   d represents 1 or 2, and
   Z represents a radical of formula Z1 or Z2:

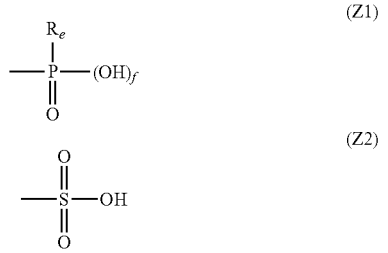

(Z1)

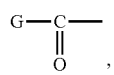

(Z2)

wherein R is hydrogen or a linear or branched $C_1$-$C_6$ alkyl, f is 0 or 1 or 2, e is 0 or 1, and d+e+f is 3, provided that when d is 2, then Z is Z1, e is 0 and P is linked to two identical or different groups [A—O—B—], and provided that in the case where d is 1, Z may also represent hydrogen or a group G or

G—C—
‖
O  , and wherein the mixing involves 2 wt % to 5.5 wt % of the fresh bitumen with respect to the total weight of the fresh and reclaimed aggregate, and with the mixing resulting in an asphalt mix with an indirect tensile strength (ITS) of at about 2.0 or more MPa, measured using an Instron universal testing machine on compression at a 50 mm/min rate at a temperature of 20° C.

2. The process according to claim 1, comprising further mixing in the asphalt mix a rejuvenation oil, with the weight ratio of surfactant to rejuvenation oil in the mix ranging between 10/90 to 40/60.

3. The process according to claim 1, wherein the at least one recycled bituminous product is chosen from among reclaimed asphalt pavement, waterproof membranes, bituminous shingles, sound-proof panels, wastes coming from their production, and the mixtures of two or more thereof.

4. The process according to claim 1, wherein an amount of surfactant provided is 0.1 to 5.0 wt % of a total mass of bitumen present in the asphalt mix.

5. The process according to claim 1, wherein the amount of surfactant ranges from 0.1 wt % to 2.5 wt %, with respect to the total mass of bitumen present in the final asphalt mix.

6. The process according to claim 1, wherein the at least one surfactant is of formula E1:

(E)$_j$-Y  (E1)

E is chosen from among G,

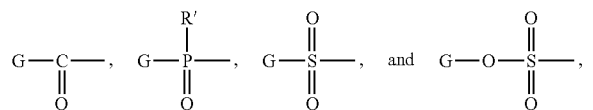

G represents a linear or branched, saturated or unsaturated, $C_1$-$C_{30}$ hydrocarbon chain, optionally containing at least one aromatic cycle, and optionally substituted by at least one phosphate group, j represents 1 or 2, and R' is chosen from among HO—, Q-O— and Q, wherein Q is a linear or branched $C_1C_6$ alkyl radical, Y represents a group chosen from among —O-T, —S-T, —N(H)$_{(2-j)}$-T, and —NT$_1$T$_2$, provided that Y is not —S-T, when E is bound to Y via a sulfur atom, T represents hydrogen or a linear, branched or cyclic or cyclic-containing moiety having carbon and hydrogen atoms, and optionally one or more heteroatoms chosen from among nitrogen, oxygen, sulfur and phosphorus, T$_1$ and T$_2$, identical or different have the same meaning as for T above, or T$_1$ and T$_2$, together with the nitrogen atom to which they are bonded, represent a saturated, partially saturated or unsaturated heterocycle, optionally further comprising one or more heteroatoms chosen from among nitrogen, oxygen, sulfur and phosphorus.

7. The process according to claim 6, wherein the at least one surfactant is chosen from compounds of formula E1$_C$, E1$_D$ and E1$_E$, wherein G is a $C_{14}$-$C_{22}$, linear, saturated or partially unsaturated hydrocarbon chain:

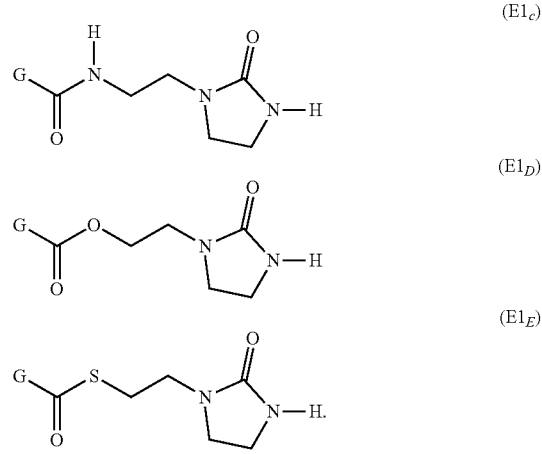

8. The process according to claim 1, wherein the fresh aggregate comprises one or more mineral aggregates, and the method further comprising the step of mixing at least one of the recycled bituminous product(s), mineral aggregates, water, optionally with a breaking control additive, together with an emulsion of the fresh bitumen, said fresh bitumen comprising at least one of the surfactant additive(s).

9. The process according to claim 1, comprising the step of mixing the at least one recycled bituminous product, fresh aggregate, optionally water, with foamed fresh bitumen comprising the at least one surfactant additive.

10. The process according to claim 1, comprising a further step that includes adding one or more other additives, chosen from among:

polyphosphoric acid, comprising all different existing grades and designations of polyphosphoric acids including pyrophosphoric acid, triphosphoric and metaphosphoric acids with phosphonic acid, pyrophosphates, and other similar compounds comprising at least one (OH—)P═O group, asphalt mix mechanical performance altering polymers, waxes, fluxants, organic or inorganic acids, esters of fatty acids and functionalized waxes, resin components, asphaltites, oils from vegetal or mineral sources and derivatives thereof,
organic fibers and/or inorganic fibers,
as well as mixtures of two or more of the above additional additives.

11. The process according to claim 1, wherein an amount of recycled bituminous product is at least 35 wt % of the total mass of the asphalt mix.

12. The process according to claim 1, wherein the fresh bitumen has a penetration value, at 1-10 mm, of one of 35/50; 50/70 and 70/100.

13. The process according to claim 12, wherein the fresh bitumen has a penetration value of 50/70.

14. The process according to claim 1 wherein the mixing involves 3 wt % to 5.0 wt % of the fresh bitumen with respect to the total weight of the fresh and reclaimed aggregate, and with the mixing resulting in an asphalt mix with an indirect tensile strength (ITS) between 2.0 and 2.2 MPa.

15. The process according to claim 1 wherein the mixing involves mixing together the fresh bitumen (A) and the at least one surfactant (B), and mixing together the fresh aggregate (C) and at least one recycled bituminous product containing aged bitumen and reclaimed aggregate (D), and introducing the mixed (A+B) to the mixed (C+D).

16. A process for the preparation of an asphalt mix, comprising mixing together, in any order:
   (a) fresh aggregate,
   (b) fresh bitumen,
   (c) at least one recycled bituminous product containing aged bitumen and reclaimed aggregate, and
   (d) at least one surfactant, which surfactant functions as a rejuvenator of the said aged bitumen, and the at least one surfactant is of formula A1:

[A-O—B—]$_d$Z    (A1)

wherein:
   A is chosen from hydrogen and a group G or

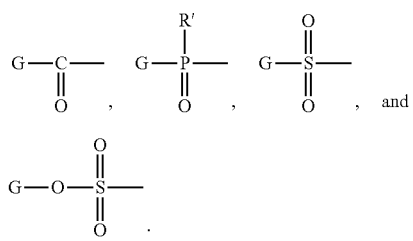

G represents a linear or branched, saturated or unsaturated, $C_1$-$C_{30}$ hydrocarbon chain, optionally containing at least one aromatic cycle, and optionally substituted by at least one phosphate group,
   B represents a bond or a divalent group containing at least one alkylene oxide repeating unit,
   d represents 1 or 2, and
   Z represents a radical of formula Z1 or Z2:

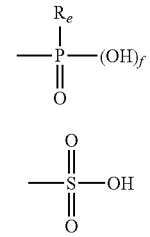

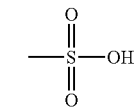

wherein R is hydrogen or a linear or branched $C_1$-$C_6$ alkyl, f is 0 or 1 or 2, e is 0 or 1, and d+e+f is 3, provided that when d is 2, then Z is Z1, e is 0 and P is linked to two identical or different groups [A-O—B—], and provided that in the case where d is 1, Z may also represent hydrogen or a group G or

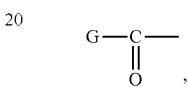

and wherein the fraction of recycled bituminous product (s) represents from about 10 wt % to about 80 wt %, of the total mass of the final asphalt mix, and the fraction of fresh aggregate represents about 5 wt % to about 75 wt % relative to the total mass of the final asphalt mix.

17. The process according to claim 16, wherein an amount of surfactant provided is 0.1 to 2.5 wt % of a total mass of bitumen present in the asphalt mix.

18. The process according to claim 16, wherein a total amount of surfactant provided is 0.4 wt % of a total mass of fresh bitumen present in the asphalt mix and a total amount of rejuvenation oil provided is 2.0 wt % of a total mass of bitumen present in the asphalt mix.

19. The process according to claim 16, wherein the surfactant and a rejuvenation oil are mixed prior to contact with recycled bituminous product.

20. The process according to claim 16 wherein the fraction of recycled bituminous product(s) represents from about 12 wt % to about 50 wt %, of the total mass of the final asphalt mix.

21. The process according to claim 20 wherein the fresh aggregate represents 56 wt % to about 75 wt % relative to the total mass of the final asphalt mix.

22. The process according to claim 16 wherein the mixing involves 2 wt % to 5.5 wt % of the fresh bitumen with respect to the total weight of the fresh and reclaimed aggregate, and with the mixing resulting in an asphalt mix with an indirect tensile strength (ITS) of at about 2.0 or more MPa, measured using an Instron universal testing machine on compression at a 50 mm/min rate at a temperature of 20° C.

23. The process according to claim 22 wherein the mixing involves 3 wt % to 5.0 wt % of the fresh bitumen with respect to the total weight of the fresh and reclaimed aggregate, and with the mixing resulting in an asphalt mix with an indirect tensile strength (ITS) between 2.0 and 2.2 MPa.

* * * * *